United States Patent [19]
Schenk

[11] 3,979,890
[45] Sept. 14, 1976

[54] RAKE FOR GATHERING AND CONTAINING FALLEN FRUIT

[76] Inventor: John H. Schenk, Star Route, Box 100, Elberta, Ala. 36530

[22] Filed: Dec. 29, 1975

[21] Appl. No.: 644,525

[52] U.S. Cl. ............................ 56/328 R; 56/400.11
[51] Int. Cl.² ........................................ A01D 51/00
[58] Field of Search ........ 56/328 R, 400.11, 400.12, 56/400.13

[56] References Cited
UNITED STATES PATENTS

| | | | |
|---|---|---|---|
| 314,373 | 3/1885 | Gibbs | 56/400.13 |
| 1,014,250 | 1/1912 | Norman | 56/400.11 |
| 1,095,585 | 5/1914 | Mack | 56/328 R |
| 3,115,740 | 12/1963 | Hartley et al. | 56/328 R |

FOREIGN PATENTS OR APPLICATIONS

| | | | |
|---|---|---|---|
| 1,270,173 | 7/1961 | France | 56/400.11 |

Primary Examiner—Russell R. Kinsey
Attorney, Agent, or Firm—Stanley B. Kita

[57] ABSTRACT

A rake for use in gathering fruit, such as nuts, fallen from a tree is disclosed. The rake includes a head assembly, an elongated handle for pulling the head assembly along the ground, and means for connecting the handle at an angle to the head assembly. The head assembly includes a tine bar having an array of tines depending in spaced relation therefrom. Each tine has an upturned tip, a shank connected to the tine bar, and a concave curved portion connecting the shank and tip to provide a fruit containing hopper in front of the rake. Similarly shaped retainer tines are mounted at opposite ends of the array above the level thereof to retain fruit in the hopper. To unload the hopper, the head assembly is tilted to permit the fruit to roll over a retainer tine and into a suitable container.

5 Claims, 6 Drawing Figures

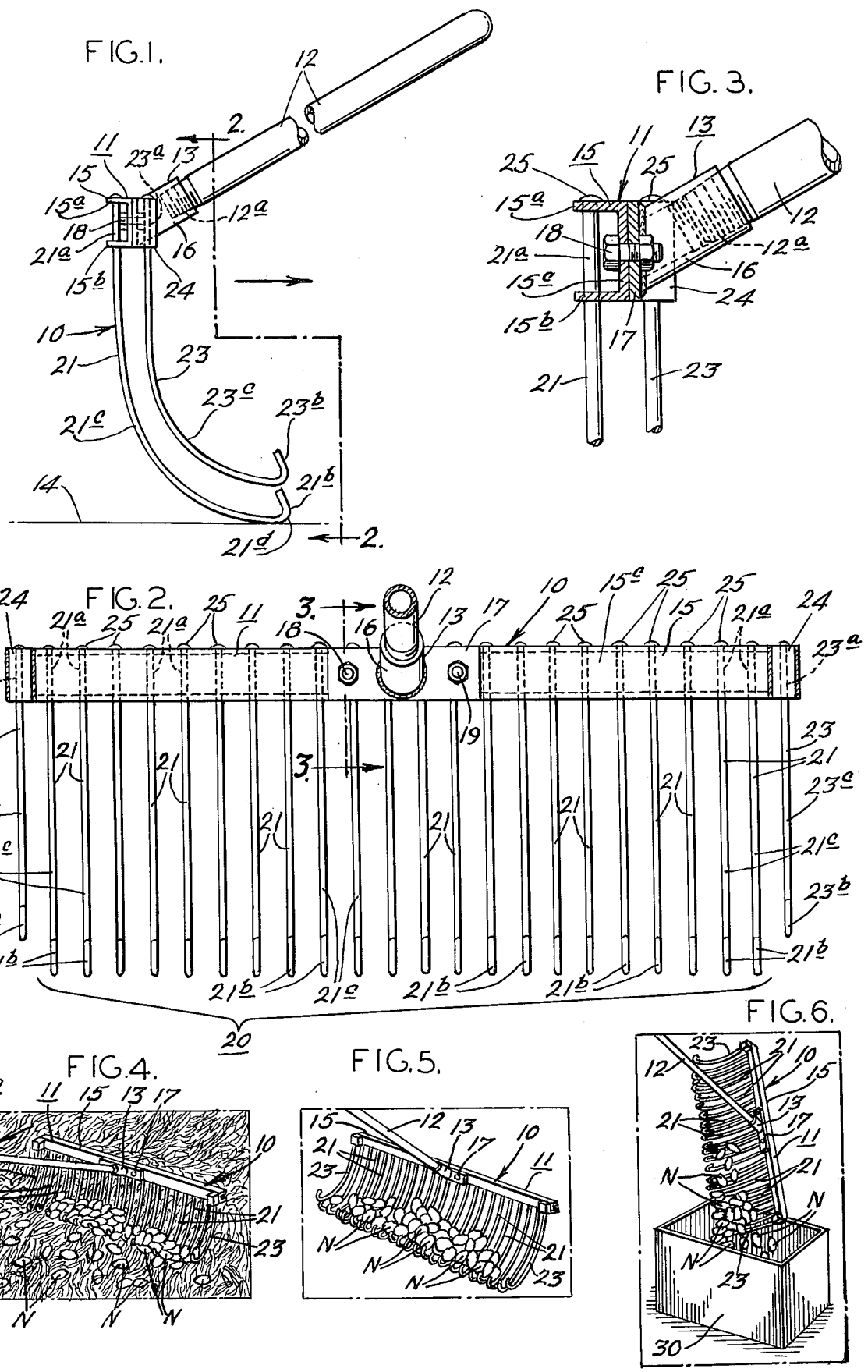

RAKE FOR GATHERING AND CONTAINING FALLEN FRUIT

The present invention relates to fruit harvesting apparatus, and more particularly, the present invention relates to hand-operated gathering devices for collecting fallen fruit such as nuts.

Hand-operated devices for gathering fallen fruit, including nuts, are known. Examples of such devices are disclosed in the U.S. Pat. Nos. 1,095,585 and 3,115,740. Although each of these patented devices may function satisfactorily for its intended purpose, each is relatively complex and expensive to manufacture. In addition, each is relatively heavy and difficult to use with sufficient speed as to afford efficient harvesting without damaging the fruit.

Automated devices for gathering fallen fruit are known. An example of such a device for gathering nuts is disclosed in my U.S. Pat. No. 3,488,932. Although the automated device functions satisfactorily, it is designed primarily for large growers who harvest nuts in large quantities. It would not be economically feasible for individual homeowners or small growers to own and operate such a device.

With the foregoing in mind, it is a primary object of the present invention to provide a novel device for gathering fallen fruit.

It is another object of the present invention to provide an improved rake which can be pulled along the ground to gather fallen fruit and to contain the same until unloaded.

A further object of the present invention is to provide a relatively simple and lightweight yet rugged rake which is particularly suited for gathering fallen nuts from grassy and/or leafy areas beneath trees.

Yet another object of the present invention is to provide a unique rake which enables fallen fruit to be gathered efficiently with a minimum of damage inflicted on the fruit during gathering.

More specifically, the present invention provides a rake which is particularly designed for gathering nuts and like fruit which has fallen from trees. The rake comprises a head assembly, an elongated handle extending away from the head assembly, and means releasably connecting the handle to the head assembly. The head assembly includes a tine bar and an array of tines depending from the bar in spaced relation therealong. Each tine has a shank connected to the tine bar and an upturned tip with an upwardly concave curvature between the shank and the tip. A pair of similarly-constructed retainer tines are mounted at opposite ends of the array for cooperating with the tines in the array to define a hopper at the front of the rake for containing nuts gathered when the rake is pulled around the ground. The gathered nuts are unloaded from the hopper by tilting the handle and allowing the nuts to roll over the retainer tine at one or the other end of the rake.

These and other objects, features and advantages of the present invention should become apparent from the following description when taken in conjunction with the accompanying drawing in which:

FIG. 1 is a view in end elevation of a rake embodying the present invention but with its handle foreshortened to facilitate illustration.

FIG. 2 is a sectional view taken on line 2—2 of FIG. 1;

FIG. 3 is a greatly enlarged fragmentary sectional view taken on line 3—3 of FIG. 2;

FIG. 4 is a perspective view in reduced scale illustrating the rake in use gathering fallen nuts;

FIG. 5 is a view similar to FIG. 4 but illustrating the gathered nuts contained in the hopper portion of the rake; and FIG. 6 is a view similar to FIGS. 4 and 5 but illustrating unloading of the nuts from the hopper portion of the rake.

Referring now to the drawing, FIG. 1 illustrates a rake 10 embodying the present invention. As best seen therein, the rake 10 comprises head assembly 11, an elongated handle 12 projecting forwardly and upwardly from the head assembly 11, and means 13 for connecting the handle 12 to the head assembly 11. As best seen in FIG. 3, the head assembly 11 includes a tine bar 15 provided by a channel member having an upper flange 15a and a lower flange 15b extending in spaced relation from an integral web 15c. The handle connecting means 13 includes an internally threaded tubular socket 16 welded to a plate 17 which is secured by bolts 18 and 19 to the front of the channel member 15. The handle 12 is threaded at 12a for threadedly engaging in the socket 16 so that when assembled the head assembly 11 can be pulled frontward in the direction of the arrows in FIGS. 1 and 4 to gather fallen fruit, such as the nuts N.

According to the present invention, the rake 10 is designed to gather and contain the nuts N until unloaded. To this end, the rake 10 has an array of tines 20 which depend from the tine bar 15 and which run along the ground 14 when the rake 10 is pulled frontward. As best seen in FIG. 2, the tine array 20 includes a series of tines 21 spaced apart along substantially the entire length of the tine bar 15. Each tine 21 has a shank 21a which extends through holes in the upper and lower flanges 15a and 15b of the tine bar channel 15. The shanks 21a, are preferably permanently fastened at least to the upper flange 15a by weldments 25.

Each tine 21 has a tip 21b which is turned upwardly and slightly rearwardly as illustrated in FIG. 1, and each tine 21 has a frontward curved portion 21c connecting the shank 21a and the tip 21b to provide the tine array 20 with a frontward concave profile, as illustrated in FIG. 1, when the handle 12 is inclined in a typical usage angle with respect to the ground 14. The slight backward inclination of the tip 21b of each tine with respect to the curved portion 21c of the tine 21 permits the nuts to roll upward and rearward over the tips 21b and onto the curved portions 21c of the tines 21 while preventing the nuts from rolling frontward past the tips 21b. Thus, the curved tines 21 and their upturned tips 21b, cooperate to provide the front of the rake 10 with a hopper for containing the nuts N gathered by the tines 21 as the rake is reciprocated along the ground such as illustrated in FIG. 4. Also, the tips 21b cooperate with the curved portions of the tines 21c to keep the nuts N from falling from the hopper when the rake 10 is lifted. The rearward inclination of the tips 21b with respect to the adjacent curved portion 21c provides each tine 21 with a bight 21d which has been found to help prevent leaves from being impaled on the tines 21. This is important in keeping the tines 21 clean and in proper working order.

In order to prevent the nuts from falling from the ends of the tines 21 in the array 20 when the rake 10 is being reciprocated along the ground, as illustrated in FIG. 4, and when the rake 10 is being lifted and moved, as illustrated in FIG. 5, retainer means is provided at opposite ends of the tine array 20. As best seen in FIG. 2, the retainer means comprises a pair of retainer tines 23 like in construction to the tines 21 but located slightly above and forward of the profile of the array 20 illustrated in FIG. 1. The tines 23 are disposed in substantially parallel relation with respect to the profile of the tines 21 and the tines 23 are spaced above and frontward of the tines 21 a distance corresponding substantially to the height or dimension of the tip 21b of the tine 21. Of course, the overall length of the tine 23 is somewhat shorter than that of the tine 21.

Each retainer tine 23 has a shank 23a, an upwardly and reversely-turned tip 23b, and a curved portion 23c connecting the shank 23a and the tip 23b. In the illustrated embodiment, blocks 24 are welded to the front of the tine bar web 15c at each end, and each block 24 has a vertical bore for receiving the shank 23a of the retainer tine 23. Preferably, the retainer tines 23 are welded in the blocks 24.

Because of the spacing (about one inch) between the upper and lower flanges 15a and 15b of the channel member 15, the tines 21 are stiffened adjacent their points of connection to the tine bar 15. This helps to prevent excessive backward flexure of the tines 21, and possible inadvertent dropping of nuts from the hopper, such as when the rake 10 is moved while loaded with fruit as illustrated in FIG. 5. Preferably, each tine is fabricated of nine gauge steel wire which is bent into the illustrated configuration.

Depending upon the size of the nuts or fruit to be gathered, the spacing between the tines 21 can be varied. However, it has been determined that when harvesting pecan nuts, of small, medium and large sizes the spacing should be ½, ⅝ or ¾ inch, respectively. Also, the length of the tine bar 15 is preferably 18 or 24 inches, depending on the quantity of nuts to be gathered with each stroke of the rake, etc. The total length of each tine 21 from end to end is about 8½ inches.

The length of the handle 12 is preferably about 5 feet and the handle 12 should subtend a vertical angle of approximately 30° with respect to the ground 14 when the rake 10 is in normal use with its tines disposed as illustrated in FIG. 1. If desired, the handle 12 can also be disposed at a horizontal angle with respect to the tine bar 15 so that the rake can be pulled along the ground with the worker standing to one side of its path of movement. This would enable the worker to stand on an area which has already been raked so that he could advance through an area to be raked without walking on the nuts.

After the nuts N are collected on the tines 21 as illustrated in FIG. 4, they can be transported in the hopper portion of the rake 10 as illustrated in FIG. 5. The nuts N can then be unloaded into a suitable container, such as the crate 30 illustrated in FIG. 6, by tilting the head assembly 11 in such a manner as to permit the nuts N to roll laterally over the retainer tine 23 at the lower end of the tine array 20. Thus, unloading of the nuts N can be accomplished speedily.

In view of the foregoing, it should be apparent that the present invention provides a relatively simple yet rugged device for gathering fallen fruit. Although the tool is particularly suited for gathering nuts, such as pecans, it should be apparent that it may be used to gather other types of fallen fruit. Since the rake is relatively lightweight, workers may use the rake for prolonged periods of time without becoming unduly fatigued. Moreover, because of its relatively simple construction, the rake may be manufactured economically.

Accordingly, while a preferred embodiment of the present invention has been described in detail, various modifications, alterations and changes may be made in the structure of the rake without departing from the spirit and scope of the present invention as set forth in the appended claims.

I claim:

1. A rake for collecting fruit randomly distributed on the ground after falling from a tree, comprising: a head assembly including an elongated tine bar and an array of tines depending from said tine bar in spaced relation therealong, each tine in said array having a shank portion mounted to said tine bar, a concave curved portion below said shank portion, and an upturned tip portion turned toward said shank portion, said curved tines and upturned tips cooperating to form a hopper below said tine bar for containing fruit gathered by the tines as they move along the ground, said head assembly also including a pair of retainer tines located at opposite ends of said array of tines to prevent fruit gathered in said hopper from rolling transversely out of said hopper during raking while affording unloading of said fruit laterally from said hopper upon tilting of said tine bar, said retainer tines being similar in construction to said tines in said array and being located upwardly out of the profile of said tine array a distance corresponding substantially to the upward dimension of one of said tine array tips; an elongated handle projecting upwardly from said tine bar at an obtuse angle with respect to the shank portion of the tines; and means connecting said handle to said tine bar to enable said tines to be moved along the ground to gather fallen fruit.

2. A rake according to claim 1 wherein said tine bar includes a channel member having upper and lower flanges and each tine shank extends through both of said flanges and has a section spanning therebetween to stiffen the tine against excessive backward flexure.

3. A rake according to claim 2 including a pair of mounting blocks located at opposite ends of said channel for securing said retainer tine shanks to said channel member.

4. A rake according to claim 2 wherein said channel member has a web with said flanges extending away from said web in a direction opposite said handle, and said means mounting said handle to said tine bar includes an internally threaded socket protruding from said channel web and external threads on said handle threadedly engaging in said socket.

5. A rake according to claim 2 wherein each tine is fabricated of a steel rod.

* * * * *